Patented June 28, 1938

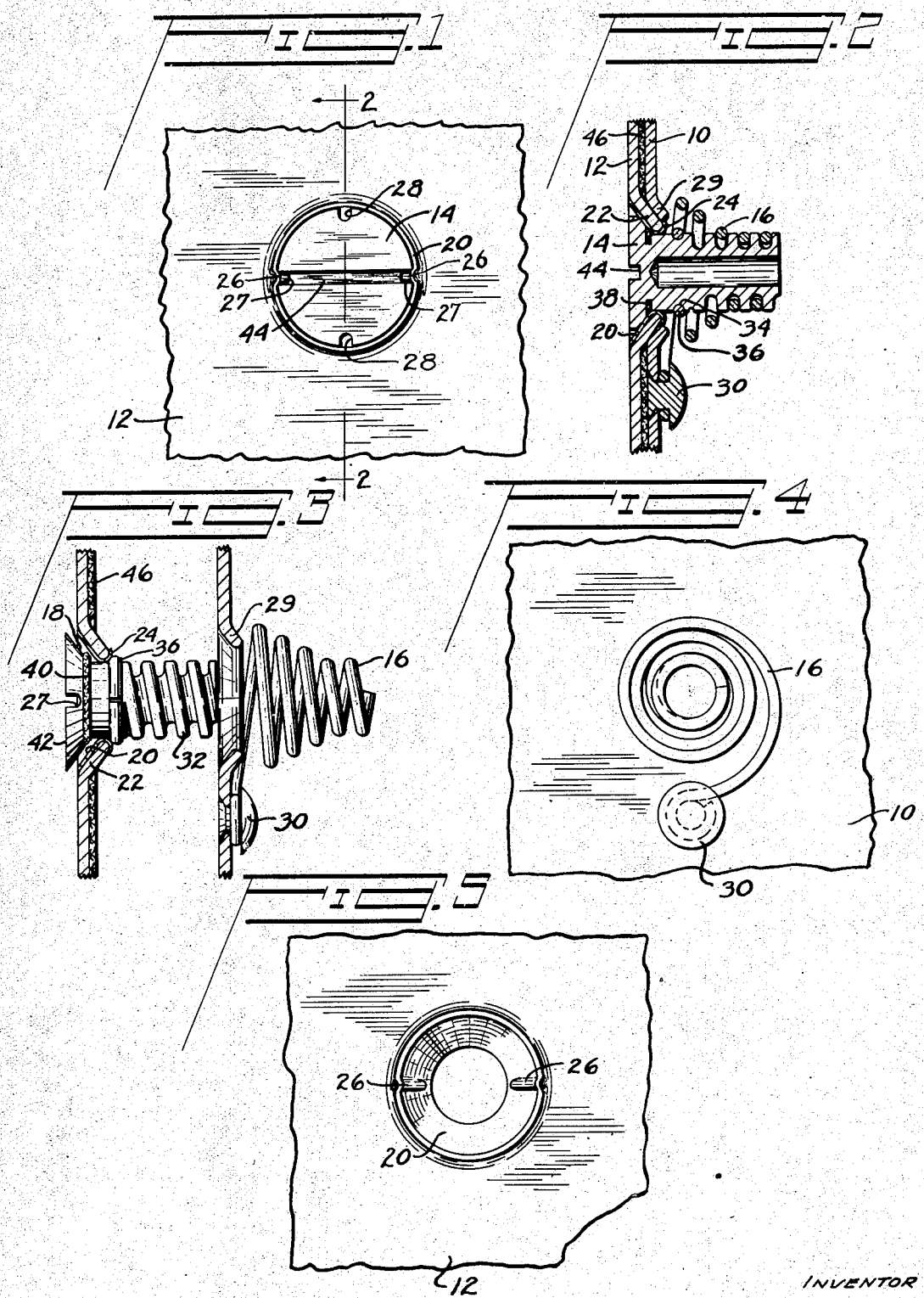

2,121,784

UNITED STATES PATENT OFFICE 2,121,784

COWLING FASTENER

Daniel Busby, Seattle, Wash.

Application March 1, 1938, Serial No. 193,291

7 Claims. (Cl. 151—32)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved means of securing articles, and is especially useful in connection with aircraft cowlings.

In the drawing, which illustrates a preferred embodiment of my invention:

Fig. 1 is an elevational view of a complete assembly showing the parts secured together in broken edges;

Fig. 2 is a section on the line 2—2 of Fig. 1;

Fig. 3 is a sectional view of the screw and support, and the retaining spring and support in position prior to assembly;

Fig. 4 is an elevational view of the retaining coil secured to its support; and

Fig. 5 is a front elevational view of the screw support with the screw removed.

Referring to the drawing, I have shown a cowling support 10 and a cowling 12 secured together by my novel anchoring arrangement consisting, as illustrated, of a screw 14 that is preferably permanently retained in the cowling and a retaining spring 16 that is fixedly attached to the cowling support. The cowling is preferably conically countersunk to receive the conical face 18 of the screw head, and is provided with a reinforcing, wear-resisting grommet 20 correspondingly countersunk to complement the countersunk portion 22 of the cowling. The grommet projects through and is folded over and crimped to the conical portion of the cowling, shown at 24. The grommet is further secured to the cowling by crimping the same by providing transverse crimps or ridges 26 projecting on the outwardly presenting face thereof. The projections cooperate with the notches 27 or 28 formed in the abutting conical face of the screw head to prevent rotation thereof due to vibration when the cowling and support are firmly secured together. The cowling support is likewise countersunk, 29, to receive the countersunk portion of the cowling, and has permanently secured thereto on its inwardly presenting face in concentric relation with the opening, the retaining spring 16 by means of a rivet 30. The spring is preferably formed, for a portion of its length, of conical shape at the inner end thereof, and is cylindrical for the remainder of its length, the conical portion being sufficiently large to encompass the conical countersunk portion 29 of the cowling support. The spring, as thus provided, is laterally and longitudinally yieldable, thereby providing, in cooperation with an opening of slightly larger diameter than the screw, means for alignment of the spring and screw when the device is used for securing parts together which can not be shifted relative to each other to effect a registry of the apertures. The longitudinal yieldability of the conical portion of the spring provides the tension by which the cowling is firmly connected to its support.

The screw has a shank portion formed with a special thread 32 that is preferably square shaped to cause the collapsing of the retaining spring by force components acting in the direction of the axis of the screw, thereby eliminating any tendency to expand the spring and reducing to a minimum the force required to compress the retaining coil. In order to permanently retain the screw in place in the cowling, the screw is formed with a groove 34 to receive a split retaining ring 36. This screw is also formed with a groove 38 adjacent to its head to receive a packing in the form of a leather washer 40, which serves to provide, when the screw is seated, an effective seal against leakage, when used as a fastener in a liquid-proof compartment, such as in floats or flying boats. The screw head is provided with a conical abutting face 18 and a flat top surface 42 having thereon a transverse slot 44 to receive a suitable tool. The depth of the slot is such that it provides, with the conical abutting face of the head, notches 27 for engagement with the projections or ridges 26 to retain the screw against rotation due to vibration when the members are firmly connected together. The screw head is provided with further notches 28 which provide for greater refinement of adjustment of the screw. Provision is made to prevent wear and rattling between the members to be connected which, as illustrated, is in the form of a fibrous material friction plate 46 cemented to the inner face of the cowling and provided with suitable perforation registering with the countersunk portion of the cowling.

It is believed that the many advantages of a fastening device constructed in accordance with the present invention will be readily understood. The language and expressions which have been employed throughout the specification are used as terms of description only and not of limitation, and said terms are intended to include all the equivalents and such modifications as are possible to be employed within the scope of the appended claims.

What is claimed is:

1. In combination, a pair of members to be connected, provided with openings to register with one another, one of said members having a helical spring fixedly secured in concentric relation with the opening on the inwardly presenting face thereof, and a screw member rotatably mounted in said opening, said screw and said helical spring being so constructed and arranged as to provide a yieldingly threaded connection for said members, said screw and the member to be connected that is disposed adjacent thereto having complemental engaging portions for fixedly securing said screw against rotation with respect to its supporting member, when the members are firmly connected together.

2. In combination, a pair of members to be connected, provided with openings to register with one another, one of said members having a helical spring fixedly secured in concentric relation with the opening on the inwardly presenting face thereof, the other of said members having one or more ridges adjacent the opening on the outwardly presenting face thereof and a screw member rotatably mounted in said opening, said screw and said helical spring being so constructed and arranged as to provide a yieldingly threaded connection for said members, said screw having a head portion provided with one or more notches on the abutting face of said head portion adapted for complemental engagement with said ridges for fixedly securing said screw against rotation with respect to its supporting member, when the members are firmly connected together.

3. In combination, a pair of members to be connected, provided with openings to register with one another, one of said members having a helical spring fixedly secured in concentric relation with the opening on the inwardly presenting face thereof, the other of said members having a reinforcing grommet of wear-resisting material fixedly secured in the opening thereof and having one or more ridges on the outwardly presenting face of said grommet and a screw member rotatably mounted in said opening, said screw member and said helical spring being so constructed and arranged as to provide a yieldingly threaded connection for said members, said screw having a head portion provided with one or more notches on the abutting face of said head portion adapted for complemental engagement with said ridges for fixedly securing said screw against rotation with respect to its supporting member, when the members are firmly connected together.

4. A screw element adapted for anchorage with a coiled wire to connect a pair of members, said screw element having a threaded shank portion and an abutting head portion, said head portion having, on the abutting face thereof one or more notches adapted for complemental engagement with one or more ridges on the member to be connected adjacent said head for fixedly securing said screw against relative rotation therewith when said anchorage is accomplished.

5. A screw element adapted for anchorage with a coiled wire to connect a pair of members, said screw element having a square threaded shank portion and a head portion, said head portion having one or more notches adapted for complemental engagement with one or more ridges on the member adjacent said head for fixedly securing said screw against relative rotation therewith when said anchorage is accomplished.

6. A screw element to connect a pair of members, having a square threaded shank portion adapted for threaded engagement with a yieldable anchoring element and a head portion provided with a locking connection integrally formed thereon and adapted for complemental engagement with one of the members to be connected to prevent relative rotation therewith when said anchorage is accomplished.

7. A fastening device for securing together two members comprising, in combination, a coiled wire adapted to be supported by one of said members and yieldable laterally and longitudinally with respect thereto and a screw element having a square threaded shank portion and a head portion, said head portion having one or more notches adapted for complemental engagement with a ridge or ridges on the other of said members to be connected, for fixedly securing said screw against relative rotation therewith when said anchorage is accomplished.

DANIEL BUSBY.